O. H. JOBSKI.
MULTIPLE SPOT WELDING MACHINE.
APPLICATION FILED AUG. 29, 1916.
1,303,906.
Patented May 20, 1919.
4 SHEETS—SHEET 1.
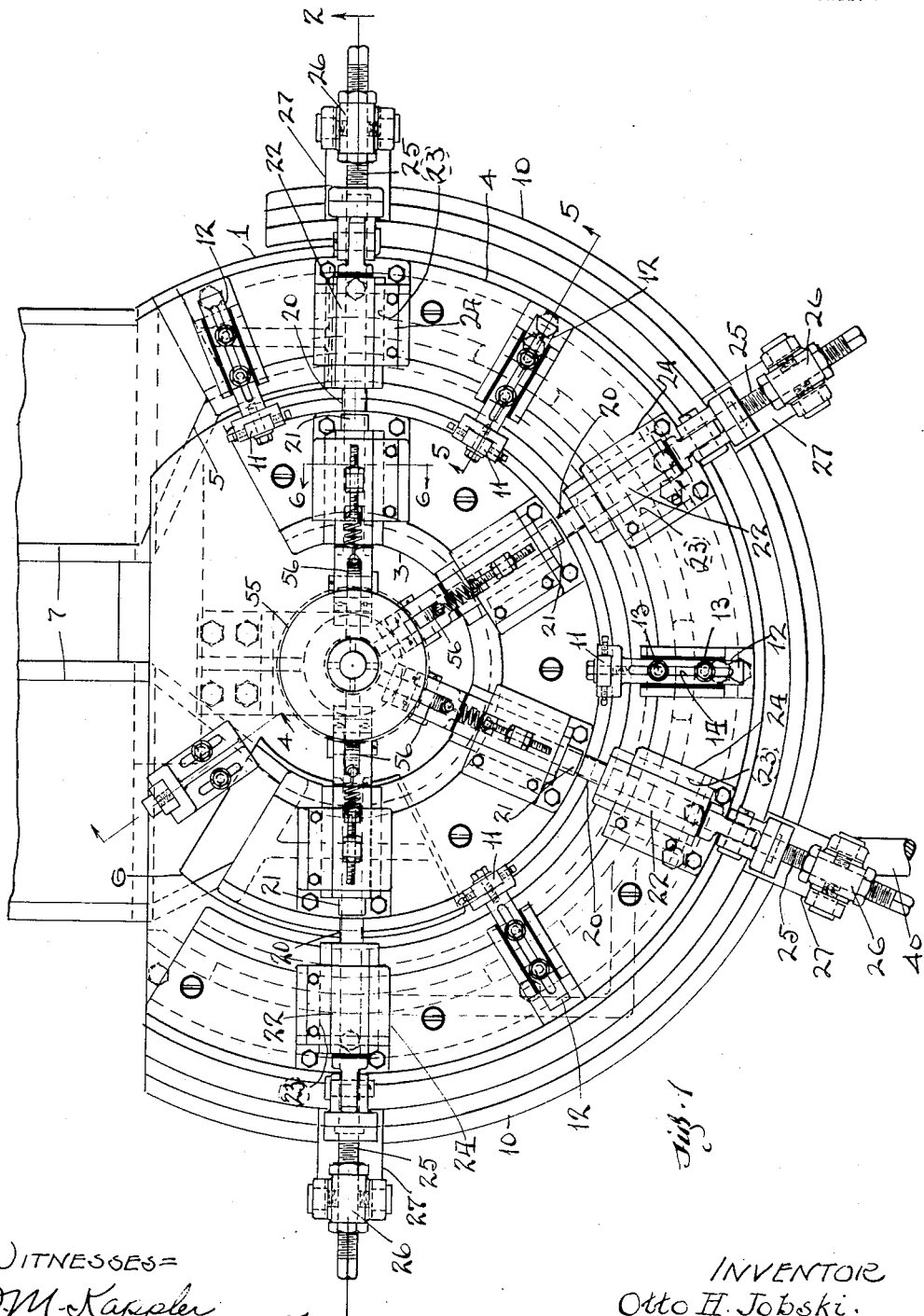
Witnesses=
O. M. Kappler
Mary Gladwell
Inventor
Otto H. Jobski.
By Fay, Oberlin & Fay
Attorneys

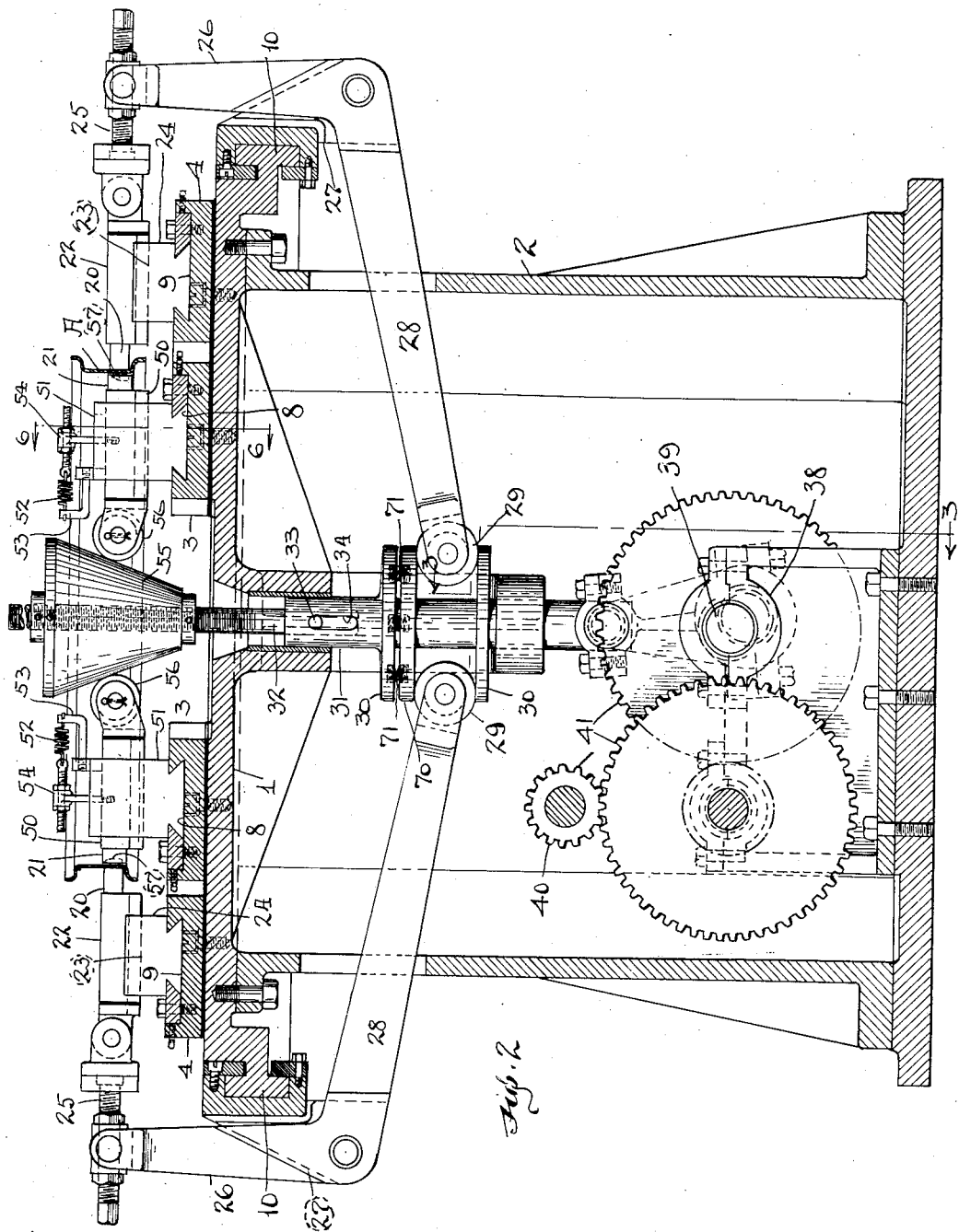

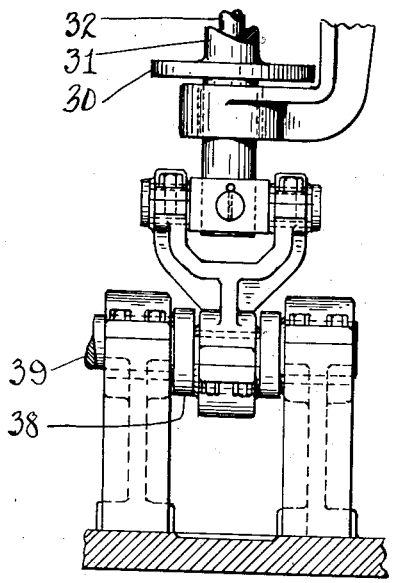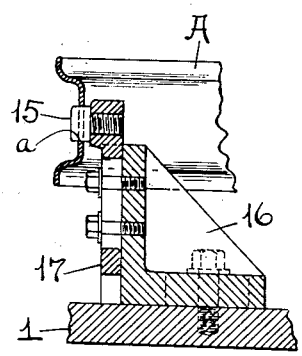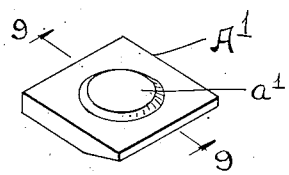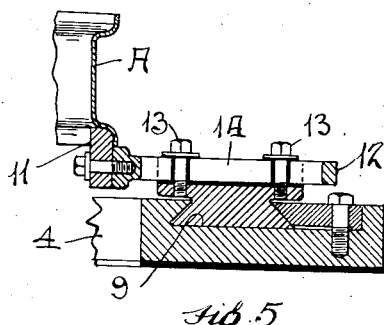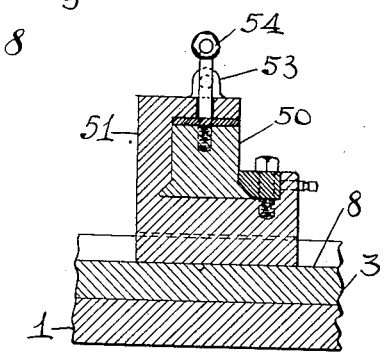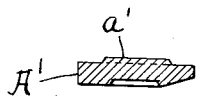

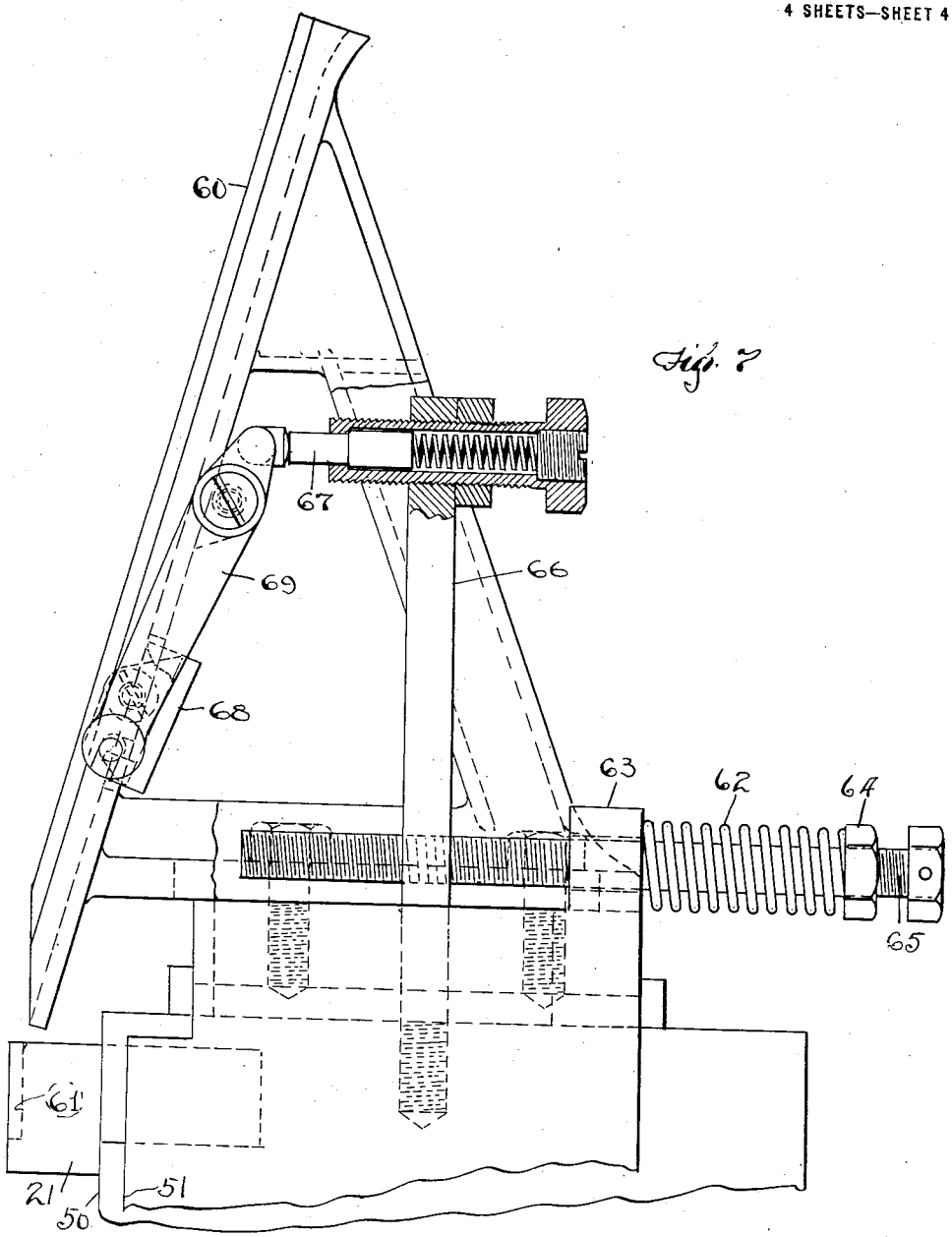

UNITED STATES PATENT OFFICE.

OTTO H. JOBSKI, OF CLEVELAND, OHIO, ASSIGNOR, BY MESNE ASSIGNMENTS, TO THE STANDARD PARTS COMPANY, OF CLEVELAND, OHIO, A CORPORATION OF OHIO.

MULTIPLE SPOT-WELDING MACHINE.

1,303,906.          Specification of Letters Patent.      Patented May 20, 1919.

Application filed August 29, 1916. Serial No. 117,404.

*To all whom it may concern:*

Be it known that I, OTTO H. JOBSKI, a citizen of the United States, and a resident of Cleveland, county of Cuyahoga, and State of Ohio, have invented a new and useful Improvement in Multiple Spot - Welding Machines, of which the following is a specification, the principle of the invention being herein explained and the best mode in which I have contemplated applying that principle, so as to distinguish it from other inventions.

The object of the present invention is to provide a machine for simultaneously welding a plurality of parts together, by the use of a heating electric current, such for example, as a plurality of supporting studs on a demountable tire supporting rim for vehicle wheels. The lugs in the particular instance just referred to, consist of small plates, somewhat in the nature of rivet heads; in fact one method of providing the same is to attach rivets to the rim, leaving the heads project from the inner face thereof. By means of the present improved mechanism, however, I render it possible to more or less automatically spot-weld any desired number of such plates at one time to the rim, it being understood that the machine is equally adaptable, with slight modifications, for use in a variety of connections where, as just indicated, it is desired thus simultaneously to affix, by welding, a number of smaller parts to a larger part.

With the accomplishment of the foregoing and related objects in view, the invention, then, consists of the means hereinafter fully described and particularly pointed out in the claims, the annexed drawings and the following description setting forth in detail certain mechanism embodying the invention, such disclosed means constituting, however, but one of various mechanical forms in which the principle of the invention may be used.

In said annexed drawings:—

Figure 1 is a plan view of a welding machine embodying my present improvements; Fig. 2 is a central vertical section thereof taken on the plane indicated by the line 2—2, Fig. 1; Figs. 3, 4, 5 and 6 are sectional views of various details, the planes of the several sections being indicated by the lines 3—3, 4—4, 5—5, and 6—6, respectively, on Figs. 1 and 2; Fig. 7 is a side elevational view of a modified form of construction of one of such details; Fig. 8 is a perspective view of one of the aforesaid lugs, for the welding of which to a rim the illustrated mechanism is specifically designed; and Fig. 9 is a transverse section of such a lug.

Having regard to the form of the articles to be operated upon, namely, rims, the illustrated machine consists of a substantially circular table 1 supported at a convenient height upon a suitable frame or base 2, the operating mechanism being housed in such base, as shown in Fig. 2. Supported in turn on the table, and suitably insulated therefrom, are two arcuate conductor-bars 3 and 4, disposed one within the other with their ends in substantial alinement, one such bus-bar having its one end 5 connected with one of the secondaries of a transformer 6 mounted to one side of the machine, and the other such bus-bar having its one end 7, preferably the one that is non-adjacent to the end 5, of the first bus-bar just named, similarly connected with the other secondary of such transformer. These bus-bars 3 and 4 are provided on their upper faces with circular undercut grooves 8 and 9, which constitute slideways for the reception of devices presently to be described, and which, along with the bars themselves, are concentric with reference to the central vertical axis of the table 1, or machine as a whole.

Suitably attached to the periphery of the table 1 is a circular rail 10, likewise concentric with such axis, which constitutes a third slideway, or guide, for supporting still other devices.

In order to receive and support the rim A (shown in Figs. 2, 4 and 5), pending operation thereon, a plurality of fingers 11 illustrated in detail in Fig. 5, are provided, these being preferably supported on the outer bus-bar 4 by means of blocks 12 bolted thereto but suitably insulated therefrom. The bolts 13 which secure the blocks to the bus-bar pass through slots 14 in the former, whereby such blocks may be adjusted radially in or out as desired, and the fingers 11 are detachably secured to the bars so as to permit of their being readily interchanged with others of different form or shape. As illustrated, four of these devices are employed, but the number obviously is a matter of indifference, and the form of the finger will of course be varied to suit the character and shape of the article being operated on.

In addition to the supporting devices just described, where the article is a rim, as in the case in hand, and such rim has been previously formed with a valve stem opening, an additional support of the form illustrated in detail in Fig. 4 is provided, this support consisting of a cylindrical finger or projection 15 that is adapted to be inserted in such opening, thereby not only assisting in the support of the article, but also serving to locate the same in proper position angularly about the axis of the machine. The complete device, as illustrated, comprises a bracket 16 directly attached to the top of the machine so as to be adjustable in a radial direction, the finger or projection 15 being carried by a plate 17 attached to the front face of such bracket, so as to be adjustable in a vertical direction.

The welding devices proper comprise a plurality of pairs of electrodes, four pairs being utilized in the present machine as illustrated in Fig. 1, one member (20) of each pair being mounted on and electrically connected with the outer bus-bar 4, and the other (21) being similarly mounted on and electrically connected with the inner bus-bar 3.

The outer electrodes 20 are simply the inner ends of bars of substantial construction slidably held in dove-tail grooves 23, formed in the upper faces of blocks 24 that are in turn adjustably held in the circular slideway 9 formed in the outer bus-bar as hereinbefore described.

Connected with the outer end of each such electrode-bar 22, by means of an adjustable link 25 of special construction, is the upper end 26 of a bell-crank, pivotally supported in a bracket 27 slidably mounted on the circular track or guide 10, so as to permit said bell-crank to be shifted about the table conjointly with the block 24, that carries the electrode. The lower arm 28 of such bell-cranks extend inwardly beneath the table and are provided with rollers 29, that are held between two collars 30 on a sleeve 31 that in turn surrounds and has a limited longitudinal movement on a vertical shaft or spindle 32 (Fig. 2). Relative movement between such shaft and the sleeve is thus limited by a pin 33 on the former engaging a longitudinal slot 34 in the latter, it being understood that the sleeve, by reason of its own weight, will normally occupy the lowest possible position, in which such pin serves to support the same.

The shaft or spindle 32 is reciprocably held in a suitable bearing 35 in the center of the table 1, such bearing being fitted to the upper end of the sleeve 31, and by another bearing 36 formed in a bracket 37 depending from the under side of such table as best illustrated in Fig. 3, and is adapted to be reciprocated by means of a crank 38 on a transverse shaft 39, that is rotated from an adjacent drive-shaft 40 through suitable gearing 41 connecting the two, as need not be described in detail.

The companion electrodes 21 to those which have just been described as operated by the bell-cranks, likewise consist of projections or bars 50 of substantial construction slidably mounted in blocks 51 that are similarly adjustably mounted in the circular slideway 8 formed on the upper face of the inner bus-bar 3. The inner electrodes differ from the outer ones in that their operating ends are recessed to receive the lugs or plates A' (illustrated in Figs. 8 and 9), or other similar smaller parts, which are to be welded to the rim A, or other similar larger part.

Said inner electrodes are normally retracted, that is drawn radially inwardly, by means of tension springs 52 attached at their inner ends to brackets 53 on the corresponding blocks and at their outer ends to projections 54 rising from the electrodes; while radially outward movement is simultaneously imparted to all of said electrodes by means of a cam 55 of inverted conical shape on the upper end of the vertically disposed, reciprocable shaft 32, such cam contacting with rollers 56 attached to, but insulated from the inner ends of the electrode-bars 50, respectively. It will be understood that the effect of the springs will be to maintain such rollers at all times in contact with said cam, so that, upon the downward movement of the shaft, all of the electrodes will be simultaneously actuated to press the lugs A', or other parts held in the recesses 57 in their outer ends, against the inner face of the rim.

As illustrated in Figs. 1 and 2, the inner electrodes of the several pairs are designed to have the parts which are to be welded to the rim individually placed in the respective recesses 54 by hand. In Fig. 7, however, I illustrate a modified construction, or rather supplemental device, for automatically thus supplying the parts in question to the recesses one at a time.

Such device, as will be readily understood from the figure in question, consists in effect of a trough or guide 60 slightly inclined from the vertical, which is directly mounted on the electrode-bar 50 with its lower or discharge end terminating just above the recess 61 in the end of such electrode. In place of a tension spring 52 for retracting such electrode-bar, a compression spring 62 is provided, being interposed between a lug 63 rising from the block 51, that holds such electrode, and a nut 64 on a bolt 65 extending inwardly from the latter. In a suitable support 66, rising from the block alongside of the trough, is resiliently mounted a plunger 67 disposed to engage and trip a double-ended keeper 68 through the medium of a connecting lever 69, whenever the electrode-bar is advanced a sufficient distance against the action of such compression spring 62, said keeper normally restraining the downward movement of the lugs in the trough 60 but permitting the same to drop one at a time when thus tripped. The action of such keeper, in other words, is similar to that of an escapement in a clock, as need not be further explained.

Having thus described with considerable detail the construction of the various component parts of my improved machine, and incidentally their individual operation, the operation of the machine as a whole should be readily apparent. The several supporting fingers 11, as well as the locating finger 15, where an article being operated upon, is a rim A having an aperture $a$ which permits of the use of the locating finger, will be shifted about on the table to solidly support the rim or like article at the proper height above the top of such table, so that when the inner electrodes 21 of the several pairs are moved outwardly the lugs, or like parts carried thereby, will be applied against the inner surface of the rim at the points desired. Such actuation of these electrodes will obviously occur upon the downward movement of the shaft or spindle 32, but such movement will initially have the effect of allowing the sleeve 31 to drop, so as to first bring the outer electrodes 20 into contact with the outer surface of the rim at points directly opposite the points at which the studs are thus applied by the inner electrodes. The pressure exerted outwardly by the inner electrodes will thus be balanced by that exerted inwardly by the outer electrodes, and the passage of the heating electric current across from the one bus-bar to the other through such electrodes and the interposed rim and stud, quickly fuses the contacting surfaces of the latter and welds them firmly together, it being understood that as shown in Figs. 8 and 9, the studs have a stamped up "spot" $a'$, which concentrates the heating effect and insures the thorough welding together of the parts.

In order to allow for a certain necessary amount of give between the parts, an annular plate 70 is desirably interposed between the rollers 29 on the inner ends of the lower bell-crank arms 28 and the upper shoulder 30 on the sleeve 31, a series of compression springs 71 permitting such plate to rise more or less relatively to such shoulder.

As soon as the welding operation is completed, this occurring almost instantly, the shaft 32 is raised immediately, allowing the inner electrodes 21 to be retracted by the springs 52 or 62, as the case may be, and thereupon the outer electrodes 20 are positively withdrawn through the action of the bell cranks.

Where the automatic feeding device illustrated in Fig. 7 is utilized, it will be observed that, as the inner electrodes are moved outwardly as heretofore described by the action of the cam 55 on the upper end of the shaft 32, a single lug A' is discharged from the trough 60 into the recess 61 in the end of each electrode just in time to be pressed, or clamped against the rim. Where this supplemental attachment is employed, the operator has nothing to do, in addition to keeping the feeding devices supplied with a stock of studs, except to place the rim on the machine, throw on the power, shut off the power, and remove the rim. If desired the machine can be directly connected to be run at a set rate of speed, and the operator thus left nothing to do but to handle the rims.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In mechanism of the character described, the combination of two parallel conductor-bars connected with the respective secondary terminals of a transformer; and paired electrodes adjustable along said bars, respectively, and adapted to be moved to clamp together the parts to be welded.

2. In mechanism of the character described the combination of two concentric conductor-bars connected with the respective secondary terminals of a transformer and paired electrodes adjustable along said bars, and capable of relative movement toward each other to clamp together the parts to be welded.

3. In mechanism of the character described, the combination of two concentric arcuate conductor bars connected with the respective secondary terminals of a transformer; paired electrodes individually adjustable along said bars, respectively and adapted to be moved to clamp together the parts to be welded.

4. In mechanism of the character described, the combination of two concentric, arcuate conductor-bars connected with the respective secondary terminals of a transformer; and paired electrodes adjustable along said bars, respectively, and adapted to be moved to clamp together the parts to be welded.

5. In mechanism of the character described, the combination of two concentric arcuate conductor bars connected with the respective secondary terminals of a transformer; paired electrodes individually adjustable along said bars, respectively and adapted to be moved to clamp together the parts to be welded, one of each pair of electrodes being adjustable radially, and operating means adapted to actuate said electrodes irrespective of the position of the latter.

6. In mechanism of the character described, the combination of two parallel conductor-bars connected with the respective secondary terminals of a transformer; paired electrodes adjustable along said bars, respectively, and adapted to be moved to clamp together the parts to be welded; and operating means adapted thus to actuate said electrodes irrespective of the position of the latter.

7. In mechanism of the character described, the combination of two parallel conductor-bars connected with the respective secondary terminals of a transformer; paired electrodes adjustable along said bars, respectively, and adapted to be moved to clamp together the parts to be welded; and operating means adapted thus to actuate said electrodes irrespective of the position of the latter, said means including a bell-crank adjustable conjointly with one of said electrodes and having one arm connected therewith, and a reciprocable shaft connected with the other arm of said bell-crank.

8. In mechanism of the character described, the combination of two parallel conductor-bars connected with the respective secondary terminals of a transformer; paired electrodes adjustable along said bars, respectively, and adapted to be moved to clamp together the parts to be welded; and operating means adapted thus to actuate said electrodes irrespective of the position of the latter, said means including a reciprocable shaft, a cam on said shaft adapted to move one of said electrodes in one direction, and resilient means tending to move said electrode in the opposite direction.

9. In mechanism of the character described, the combination of two parallel conductor-bars connected with the respective secondary terminals of a transformer; paired electrodes adjustable along said bars, respectively, and adapted to be moved to clamp together the parts to be welded; and operating means adapted thus to actuate said electrodes irrespective of the position of the latter, said means including a bell-crank adjustable conjointly with one of said electrodes and having one arm connected therewith, a reciprocable shaft connected with the other arm of said bell-crank, a cam on said shaft adapted to move the other of said electrodes toward said first-named electrode, and resilient means tending to retract said last-named electrode.

10. In mechanism of the character described, the combination of two concentric, arcuate conductor-bars connected with the respective secondary terminals of a transformer; a plurality of pairs of electrodes adjustable along said bars, respectively, and adapted to be moved to clamp together the parts to be welded; and operating means adapted thus to actuate said electrodes irrespective of the position of the latter.

11. In mechanism of the character described, the combination of two concentric, arcuate conductor-bars connected with the respective secondary terminals of a transformer; a plurality of pairs of electrodes adjustable along said bars, respectively, and adapted to be moved to clamp together the parts to be welded; and operating means adapted thus to actuate said electrodes irrespective of the position of the latter, said means including a series of bell-cranks corresponding with said pairs of electrodes and adjustable conjointly therewith, each bell-crank having one arm connected with the outer electrode of the adjacent pair, a reciprocable shaft alined with the axis of said bars and connected with the other arms of said bell-cranks, a cam on said shaft adapted to move the inner electrodes of each pair outwardly, and resilient means tending to retract said inner electrodes.

12. In mechanism of the character described, the combination of two parallel conductor-bars connected with the respective secondary terminals of a transformer; paired electrodes adjustable along said bars, respectively, and adapted to be moved to clamp together the parts to be welded; and an automatic part-feeding device attached to one of said electrodes so as to be operated in conjunction therewith.

13. In mechanism of the character described, the combination of two concentric, arcuate conductor-bars connected with the respective secondary terminals of a transformer; paired electrodes adjustable along said bars, respectively, and adapted to be moved to clamp together the parts to be welded; and an automatic part-feeding device attached to the inner of said electrodes so as to be operated in conjunction therewith.

14. In mechanism for welding parts onto rims and the like, the combination of a series of circularly disposed supports for a rim; two concentric, arcuate conductor-bars disposed to lie, one within and the other without such rim, and connected with the respective terminals of a transformer; and paired electrodes adjustable along said bars, respectively, and adapted the one to contact with one side of such rim and the other to press the article to be welded to such rim against the other side thereof.

15. In mechanism for welding parts onto rims and the like, the combination of a series of circularly disposed supports for a rim; two concentric, arcuate conductor-bars disposed to lie, one within and the other without such rim, and connected with the respective terminals of a transformer; paired electrodes adjustable along said bars, respectively, and adapted the one to contact with one side of such rim and the other to press the article to be welded to such rim against the other side thereof; and an automatic part-feeding device attached to said last-named electrode so as to be operated in conjunction therewith.

Signed by me, this 25th day of August, 1916.

OTTO H. JOBSKI.

Attested by—
KATHERINE L. GIBBONS,
WALTER C. VOSS.